United States Patent [19]

Macintyre

[11] Patent Number: 4,698,237
[45] Date of Patent: Oct. 6, 1987

[54] METAL SURFACE HARDENING BY CARBIDE FORMATION

[75] Inventor: Robert M. Macintyre, Skipton, England

[73] Assignee: Rolls-Royce plc, London, England

[21] Appl. No.: 810,224

[22] Filed: Dec. 17, 1985

[30] Foreign Application Priority Data

Jan. 4, 1985 [GB] United Kingdom ............... 8500196

[51] Int. Cl.⁴ ............................................. B05D 3/06
[52] U.S. Cl. ......................... 427/53.1; 219/121 LM; 219/121 LE; 219/121 LF; 427/122; 427/376.1
[58] Field of Search ............... 427/53.1, 122, 376 L; 219/121 LM, 121 LE, 121 LF

[56] References Cited

U.S. PATENT DOCUMENTS

| 2,196,128 | 4/1940 | Stuart | 427/53.1 |
| 2,719,355 | 10/1955 | Diffenderfer | 427/122 X |
| 4,122,240 | 10/1978 | Banas et al. | 427/53.1 X |
| 4,157,923 | 6/1979 | Yen et al. | 427/53.1 X |
| 4,212,900 | 7/1980 | Serlin | 427/53.1 |
| 4,232,094 | 11/1980 | Rhodes et al. | 428/614 |

FOREIGN PATENT DOCUMENTS

| 0092683 | 2/1983 | European Pat. Off. |
| 1248733 | 10/1971 | United Kingdom |
| 1258561 | 12/1971 | United Kingdom |
| 1501342 | 2/1978 | United Kingdom |
| 1538364 | 1/1979 | United Kingdom |
| 2004919A | 4/1979 | United Kingdom |
| 1547172 | 6/1979 | United Kingdom |
| 2022146A | 12/1979 | United Kingdom |
| 1574984 | 9/1980 | United Kingdom |
| 1587235 | 4/1981 | United Kingdom |

*Primary Examiner*—Thurman K. Page
*Attorney, Agent, or Firm*—Cushman, Darby & Cushman

[57] ABSTRACT

A method of surface hardening a metal surface in which the surface is firstly coated with a colloidal dispersion of graphite and then locally melted, in an inert atmosphere or vacuum, so that the molten metal reacts with the graphite to form a metal carbide. On resolidification, the metal carbide defines a dendritic carbide structure within the metal adjacent its surface.

11 Claims, 10 Drawing Figures

METAL SURFACE HARDENING BY CARBIDE FORMATION

This invention relates to a method of surface hardening metals by carbide formation and to metals having surfaces so hardened.

There are certain metals, such as titanium and alloys thereof, which have high strength to weight ratios but which are nevertheless restricted in their use because of high wear rates under conditions of sliding or fretting. Attempts to overcome this problem have mainly centred around the provision of a wear resisting coating on the metal surface or the deposition of wear resistant particles in the locally melted surface of the metal. In the former case, a mixture of a matrix material, such as a cobalt or nickel-based alloy, and wear resistant particles of tungsten carbide, chromium carbide or titanium carbide, is plasma or flame sprayed on to the metal surface. In the latter case, wear resistant particles of, for instance, titanium carbide, are injected into a laser beam melted area of the metal surface. Such a method is described in U.S. Pat. No. 4,299,860.

In both of the above known methods of providing wear resisting coatings, there is a danger that the wear resistant particles will not be evenly distributed within the matrix material which retains them. If the wear resistant particles are not evenly distributed there is a likelihood of accelerated wear occuring in those regions which are particle deficient.

It is an object of the present invention to provide a method of hardening a metal surface which is less prone to hardness inconsistences than is the case with the prior art methods described above.

According to the present invention, a method of surface hardening a metal comprises locally melting the metal surface with a beam of high energy radiation in an inert atmosphere or vacuum and in the presence of elemental carbon for sufficient time for said metal and carbon to react to produce a carbide which, on subsequent resolidification, defines a dendritic carbide structure within said metal adjacent the surface thereof.

The invention will now be described, by way of example, with reference to the accompanying drawings in which:

BRIEF DESCRIPTION OF THE DRAWING

With reference to FIG. 1, a translatable platform 10 situated in an argon atmosphere supports a titanium workpiece 11, the surface of which is to be hardened in accordance with the method of the present invention, beneath a beam 12 of coherent radiation from a laser (not shown). The laser beam 12 is disposed normally to the titanium workpiece 11 and is of sufficient energy to cause surface melting of that area of the titanium workpiece 11 which it impinges. It will be appreciated however that the laser beam 12 could be inclined if so desired.

Figure 1:
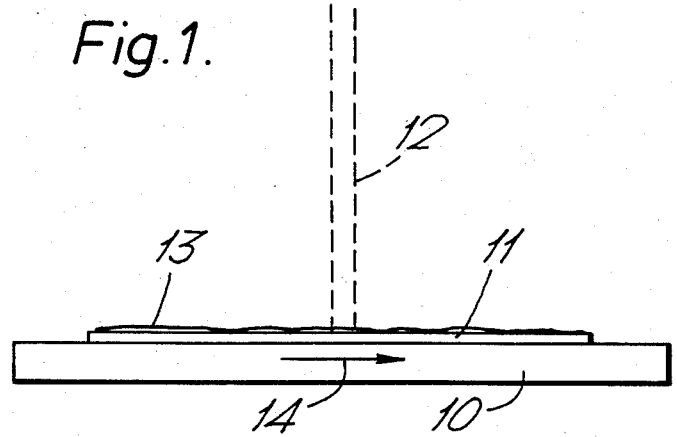
FIG. 1 is a side view of apparatus suitable for carrying out the method of the present invention.

Prior to the laser beam 12 being directed on to the titanium workpiece 11 its surface is coated with a colloidal dispersion of graphite 13 by brushing, although other forms of graphite such as flake, could be used if so desired. Other methods of application, such as spraying, may be used however if so desired. When the laser beam 12 locally melts the surface of the titanium workpiece 11, the molten titanium dissolves the graphite and titanium carbide is formed from the melt. The platform 10 is continuously translated in the direction indicated by the arrow 14 so that the thus formed titanium carbide and the molten titanium quickly solidify to leave a titanium carbide dendritic structure within a titanium matrix adjacent the surface of the titanium workpiece 11.

The thus formed titanium carbide provides the titanium workpiece 11 with a tough wear resistant surface which, in view of its dendritic structure is evenly distributed across the workpiece 11 surface.

Figure 2:
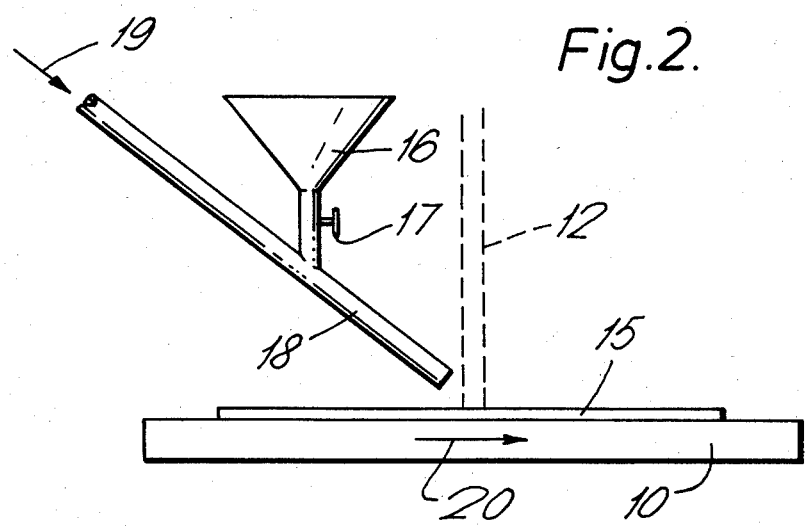
FIG. 2 is a side view of an alternative form of apparatus suitable for use in the method of the present invention.

In an alternative method of forming a tough wear resistant dendritic titanium carbide structure within a titanium workpiece surface, the titanium workpiece 15 is positioned on a translatable platform 10 beneath a normally incident laser beam 12 as described above. However, the surface of the titanium sheet 15 is not coated with a graphite dispersion. The carbon for reaction with the molten titanium is instead contained within a hopper 16 which is positioned above the sheet 15 as can be seen in FIG. 2. A metering device 17 located below the hopper 16 meters a steady flow of carbon particles into an inclined duct 18 through which there is a flow of argon or other inert gas in the direction indicated by the arrow 19. The duct 18 is so positioned with respect to the laser beam 12 that it directs the carbon particles and argon into the area of laser beam 12 impingement upon the workpiece 15 surface and hence into the titanium locally melted by the beam 12. The molten titanium dissolves the carbon and titanium carbide is formed from the melt which titanium carbide, upon translation of the platform in the direction indicated by the arrow 20 and the subsequent resolidification of the titanium, forms a dendritic structure within a titanium matrix adjacent the workpiece 15 surface. Since argon from the duct 18 washes the reaction area of molten titanium, it is not necessary to enclose the whole apparatus in an argon atmosphere although total enclosure is usually desirable in avoiding oxidation.

A series of tests were carried out surface hardening titanium and titanium alloy sheets using the method described with respect to FIG. 1. The tests were carried out using a 2 KW CW $CO_2$ laser operated at between ~1.2 and 1.8 KW. Interaction times, that is times of interaction between the laser beam and the titanium sheet, were controlled by varying the diameter of the laser beam from 0.4 to 3 mm and the translation speed of the platform from 7 to 50 mm/second. The surfaces of the titanium sheets used were grit blasted in order to provide a standard finish.

Two different metals were used in the preparation of the sheets 11. They were chemically pure titanium and a titanium alloy containing six percent by weight aluminium and four percent by weight vanadium. The sheets were coated with a colloidal dispersion of graphite in methanol by brushing. Several successive laser treatments (up to 16) were applied to each sheet with a fresh coating of the colloidal graphite dispersion being applied between each treatment.

Microstructural observations of the treated sheets were made using light and scanning electron microscopy and microhardness measurements (using a 100 g load) were made, mainly on transverse sections.

Figure 3:
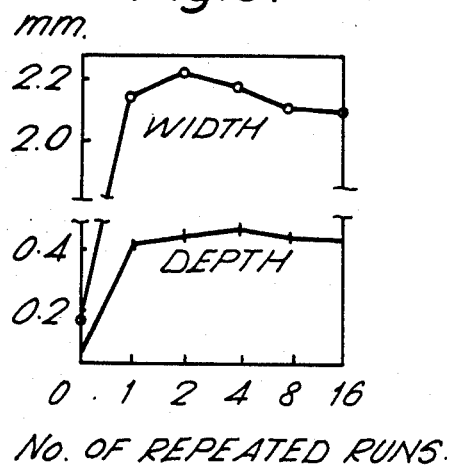
FIGS. 3-10 are graphs indicating various physical properties of metal surfaces hardened in accordance with the method of the present invention.
Figure 4:
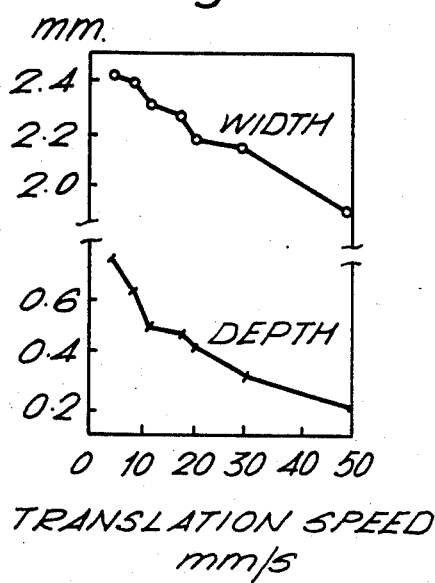

In considering the results of these tests, FIG. 3 shows the variation of depth and width of the processed zone of a chemically pure titanium sheet using a 1.72 KW laser beam power, a translation speed of 20 mm/s. and a laser beam width of 3 mm diameter. There were sixteen repeated runs with a coating of colloidal graphite being applied before each run. FIG. 3 indicates that a melt zone depth of ~0.4 mm and width of ~2.1 mm remain effectively constant for up to sixteen runs. FIG. 4 indicates that the dimensions of the melt zone as a function of translation speed for single track experiments shows the trend if a decrease in depth and width with increasing translation speed.

Figure 5:
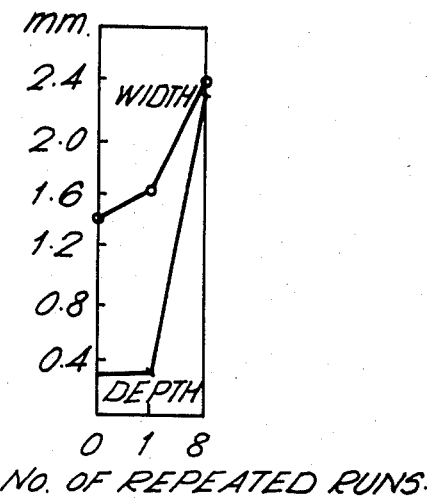
Figure 6:
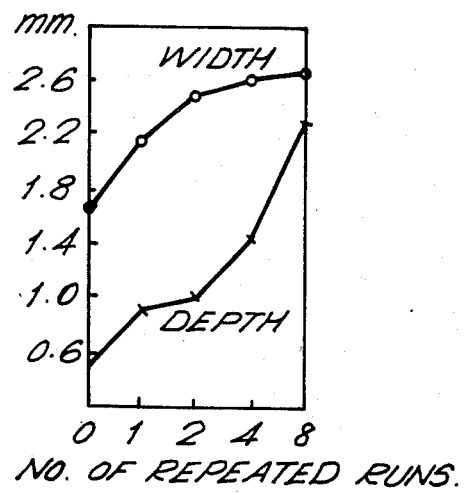

The corresponding results using the sheet formed from the titanium alloy are indicated in FIGS. 5 and 6 were obtained using a narrower laser beam 12 (1.5 mm diameter), a translation speed of 20 mm/s and two laser power levels (1.2 KW for FIG. 5 and 1.8 KW for FIG. 6). There was no clear evidence of the anticipated trend towards increased depth and width with power increase. However there was an unexpected effect in that the zone depth and width exhibited a progressive increase with repeated treatment cycles.

Cracking was not observed under any of the conditions examined using either the chemically pure titanium or the titanium alloy.

X-ray diffraction examination of all of the samples showed the presence of titanium carbide in the melted zones. The carbide lattice parameters were as follows for repeat treatment conditions (designated high carbon), and single treatments (designated low carbon), chemically pure titanium sheet 11: 4.329A (high carbon), titanium alloy sheet 11: 4.305A (high carbon): 4.318A (low carbon).

Figure 7:
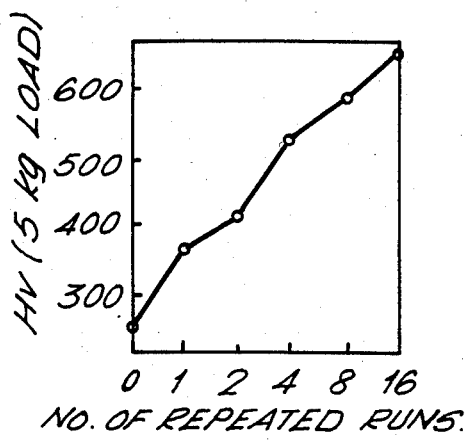
Figure 9:
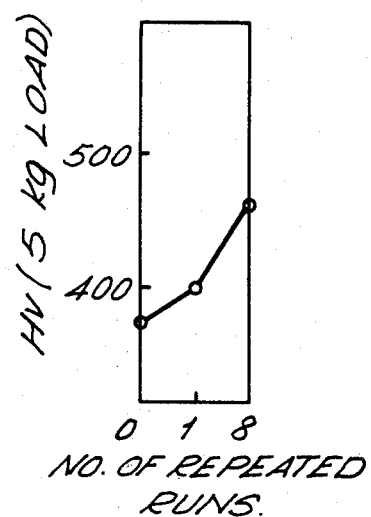
Figure 8:
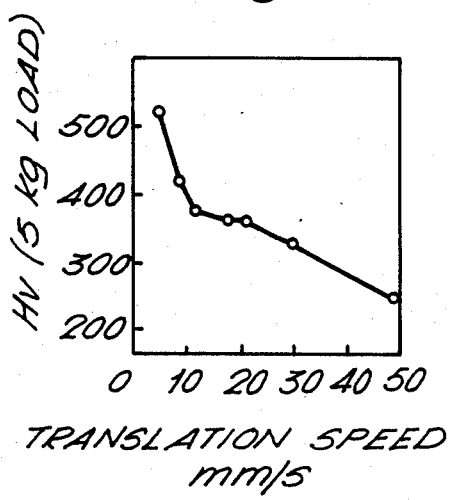
Figure 10:
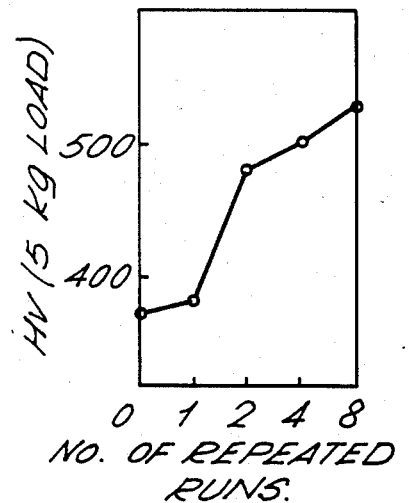

The hardness levels of the melted zones (FIGS. 7 and 8 for chemically pure titanium and FIGS. 9 and 10 for the titanium alloy) show a progressive increase in hardness with increased carbon content through repeated treatment runs, the maximum being ~650 HV after 16 runs with the chemically pure titanium sample. FIG. 8 illustrates the hardness decrease with increase in translation speed.

Microscopic examination of the samples indicated that in the single treatment examples (one run) there were carbide particles present which were of a feathery, flake-like morphology, some of them being formed into a network. The samples exposed to eight successive runs had a higher volume fraction of carbides and the morphology was dendritic. The carbide dendrites were coarser nearer the top of the melted zone than at the base. In a shallow high carbon melt zone there was an upper region in which carbide dendrites extended downwards from the melt surface. In a deep zone, some carbide particles up to 100 μm in diameter were heterogenously dispersed in addition to the dendritic particles.

It will be seen therefore that the method of the present invention provides a method of surface hardening titanium which, since it promotes dendritic titanium cabide formation adjacent the titanium surface, provides a more even distribution of surface hardness than has previously been achieved using the injection of carbide particles into a molten surface.

Although the present invention has been described with reference to the surface hardening of titanium and an alloy thereof using a laser beam, it is envisaged that the invention need not be so restricted. Generally speaking, the method is applicable to metals which are strong carbide formers and the beam used to melt the metal surface needs to be a beam of high energy radiation in order to achieve the necessarily rapid surface melting. Thus the laser beam could, for instance, be replaced by an electron beam in which case the inert atmosphere would be replaced by a vacuum.

I claim:

1. A method of surface hardening a metal surface comprising locally melting the metal surface with a beam of high energy radiation in an inert atmosphere or vacuum and in the presence of elemental carbon for sufficient time for said metal and carbon to react to produce a carbide which, on subsequent resolidification, defines a dendritic carbide structure within said metal adjacent the surface thereof.

2. A method of surface hardening a metal surface as claimed in claim 1 wherein said local melting and resolidification of said metal surface in the presence of elemental carbon to produce a dendritic carbide structure is performed more than once on each portion of said metal surface requiring surface hardening.

3. A method of surface hardening a metal surfce as claimed in claim 1 wherein said beam of high energy radiation is constituted by a laser beam.

4. A method of surface hardening a metal surface as claimed in claim 3 wherein said laser beam is provided by a laser having a power output of up to 2 KW.

5. A method of surface hardening a metal surface as claimed in claim 4 wherein said laser beam has a diameter of between 0.4 and 3 mm at its point of impingement upon said metal surface.

6. A method of surface hardening a metal surface as claimed in claim 1 wherein relative motion is effected between said beam and said metal surface so that adjacent regions of said metal surface are successively melted in the presence of said elemental carbon and subsequently resolidify.

7. A method of surface hardening a metal surface as claimed in claim 6 wherein said relative motion is effected at a speed of between 7 and 50 mm/second.

8. A method of surface hardening a metal surface as claimed in claim 1 wherein said elemental carbon is in the form of particulate carbon substantially evenly distributed over said metal surface prior to the local melting thereof.

9. A method of surface hardening a metal surface as claimed in claim 8 wherein said carbon is in the form of colloidal graphite.

10. A method of surface hardening a metal surface as claimed in claim 1 wherein said elemental carbon is directed into the metal melted by said high energy beam.

11. A method of surface hardening a metal surface as claimed in claim 1 wherein said metal is titanium or an alloy thereof.

* * * * *